(12) United States Patent
Cromwell et al.

(10) Patent No.: US 6,596,083 B2
(45) Date of Patent: Jul. 22, 2003

(54) DISK LUBRICATION MECHANISM

(75) Inventors: Evan F. Cromwell, Redwood City, CA (US); Johann F. Adam, Palo Alto, CA (US); Eric D. Moen, Fremont, CA (US)

(73) Assignee: Toda Citron Technology, Inc., Milpitas, CA (US)

( * ) Notice: Subject to any disclaimer, the term of this patent is extended or adjusted under 35 U.S.C. 154(b) by 0 days.

(21) Appl. No.: 09/810,835

(22) Filed: Mar. 16, 2001

(65) Prior Publication Data

US 2002/0132043 A1 Sep. 19, 2002

(51) Int. Cl.[7] .............................................. B05C 19/02
(52) U.S. Cl. ...................... 118/423; 118/503
(58) Field of Search .................. 294/93, 89, 98.1; 414/729, 908, 226.01; 118/423, 421, 503; 901/31, 32; 269/47, 48.1

(56) References Cited

U.S. PATENT DOCUMENTS 3,075,800 A  *  1/1963  Kamp
4,735,540 A     4/1988  Allen et al. ................. 414/222
5,879,121 A  *  3/1999  Kempf

OTHER PUBLICATIONS

German Utility Model G 93 07 263.5, Jul. 1993.*

* cited by examiner

Primary Examiner—Brenda A. Lamb
(74) Attorney, Agent, or Firm—Silicon Valley Patent Group LLP; Michael J. Halbert

(57) ABSTRACT

A system for processing a disk includes an end-effector having a plurality of fingers. The end-effector is mounted to a rotary actuator. The rotary actuator is mounted to a linear stage. The linear stage is positioned adjacent to an air track and a tank. The rotary actuator and the linear stage place the fingers into the inner diameter of a disk on the air track. The fingers grip the inner diameter of the disk. The rotary actuator and the liner stage then place the fingers holding the disk into the tank. The tank is filled with a processing liquid such as a lubrication solution to lubricate the disk.

21 Claims, 14 Drawing Sheets

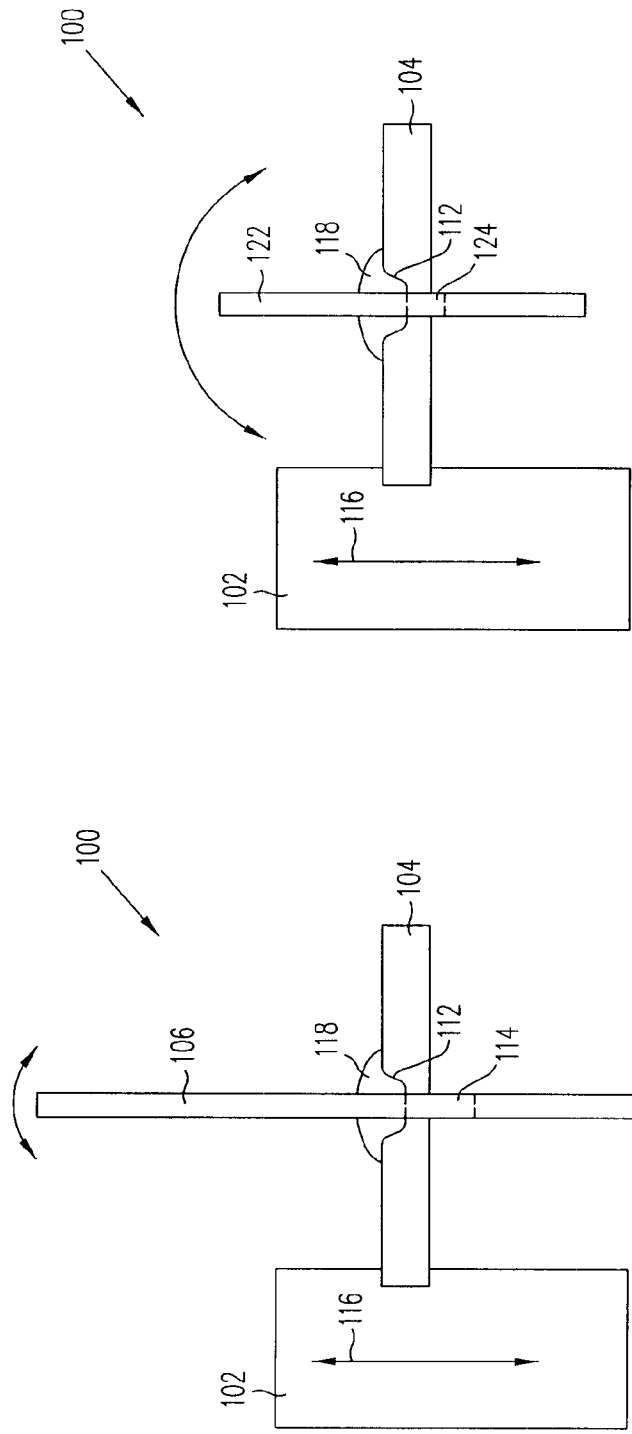
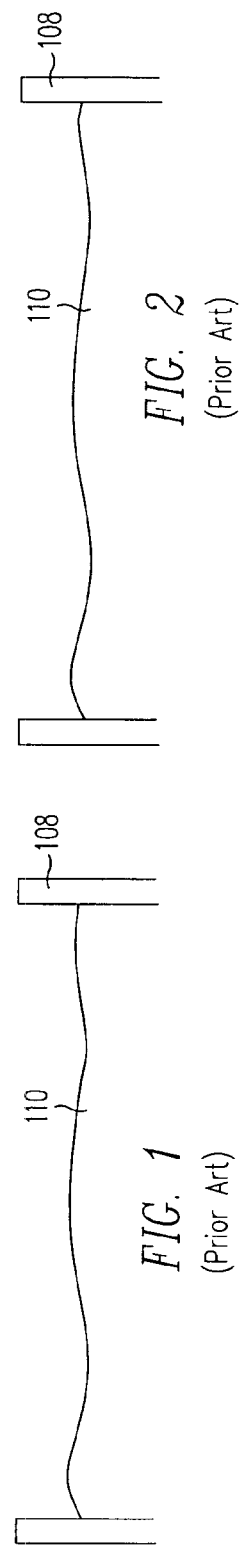
FIG. 1 (Prior Art)
FIG. 2 (Prior Art)

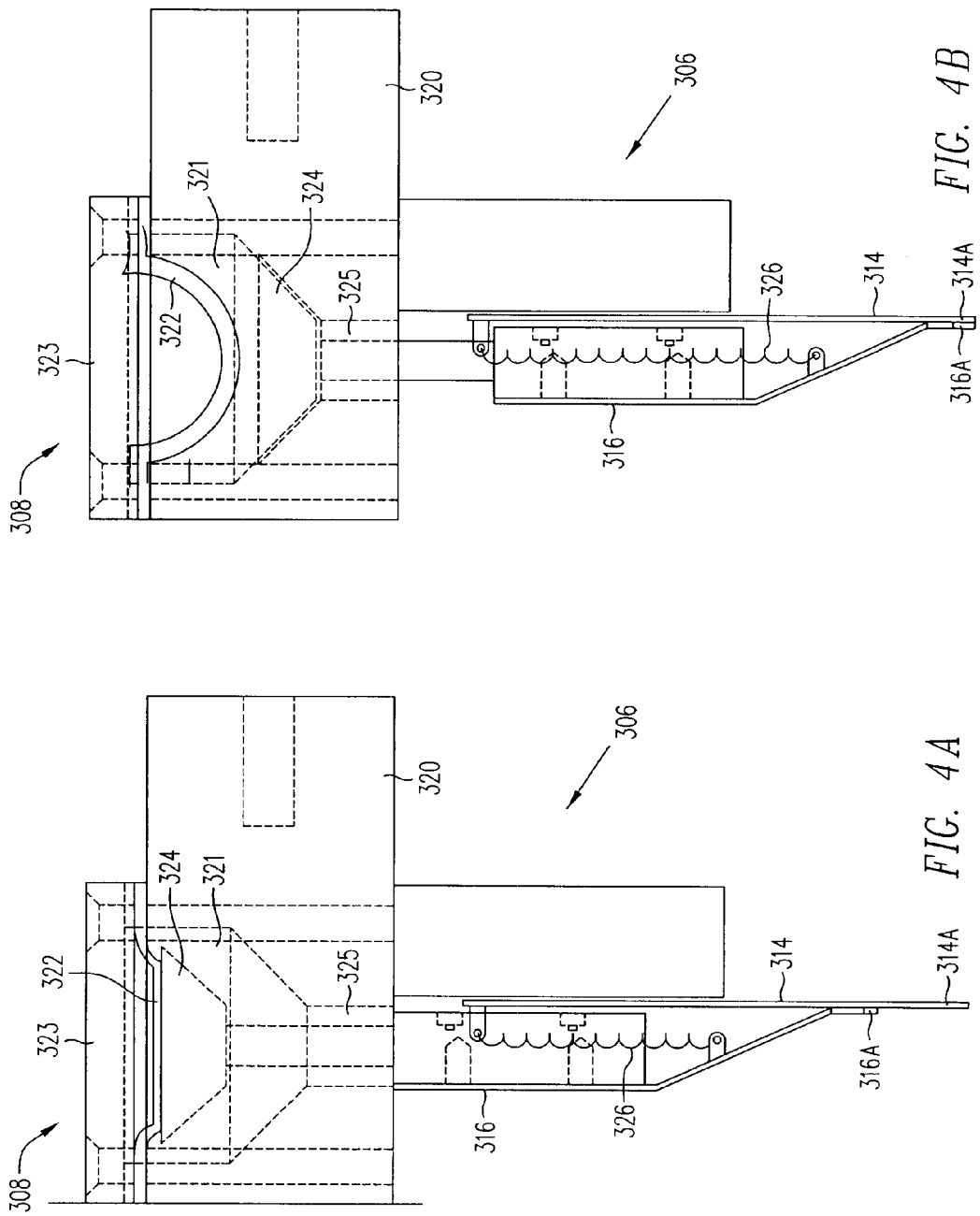

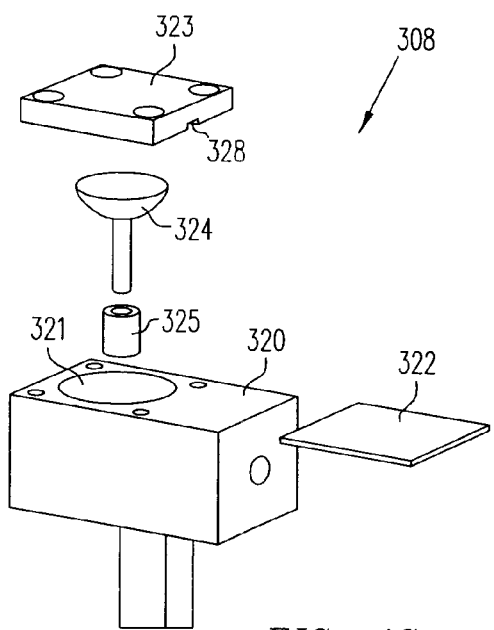
FIG. 4C
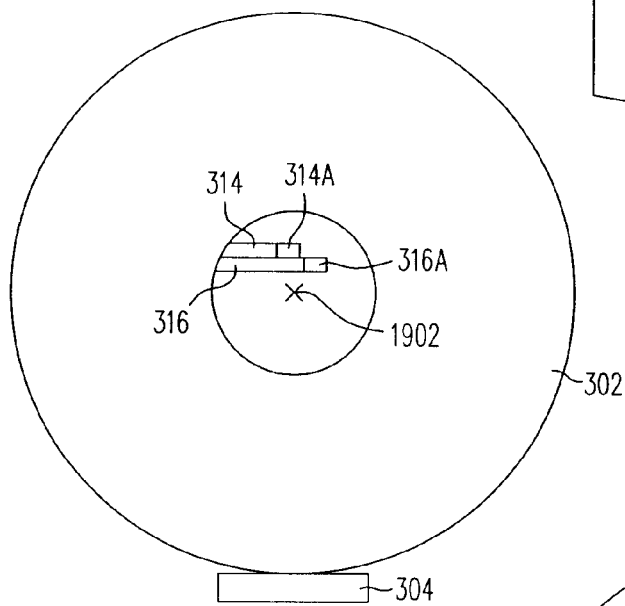
FIG. 23A
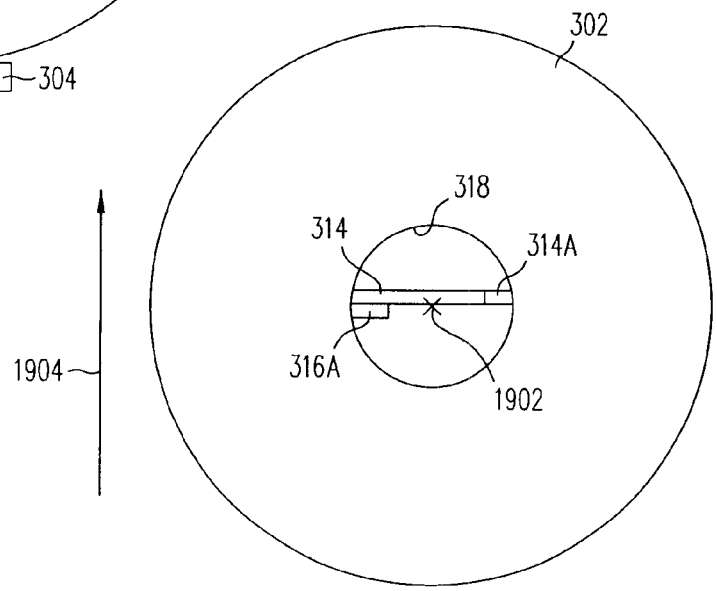

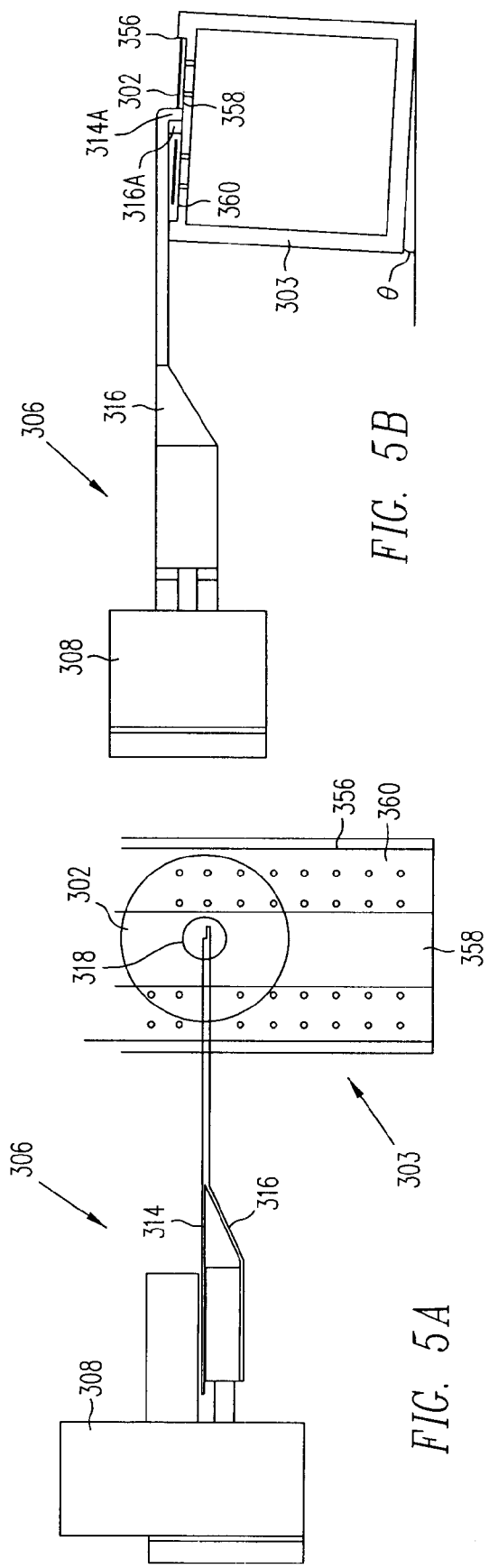
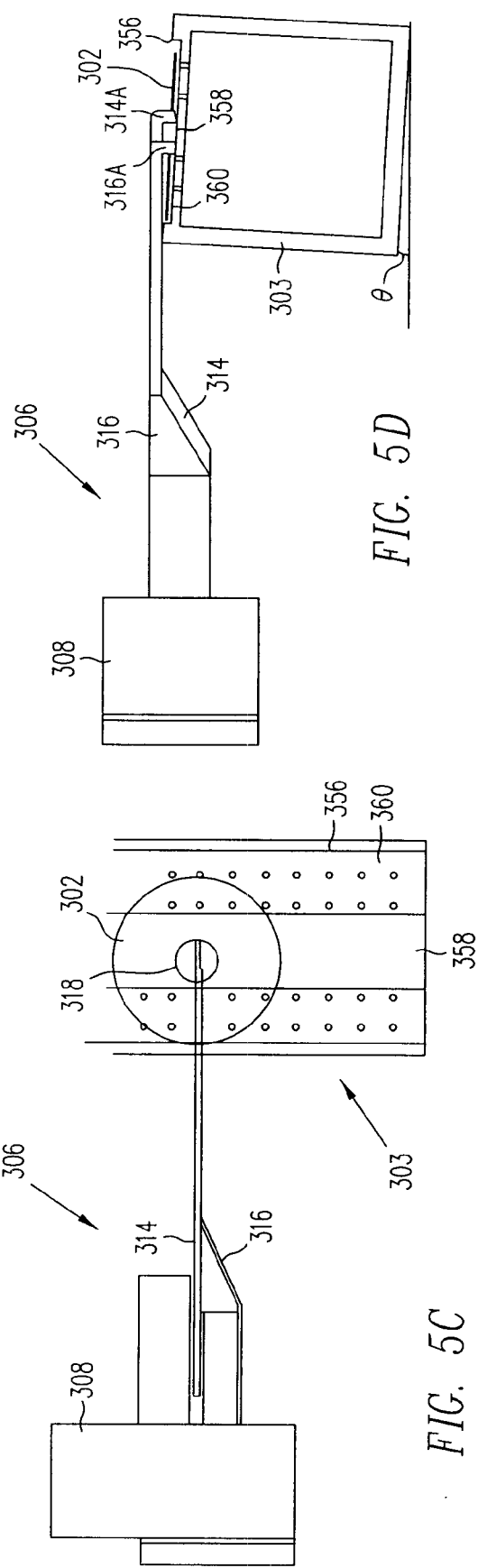

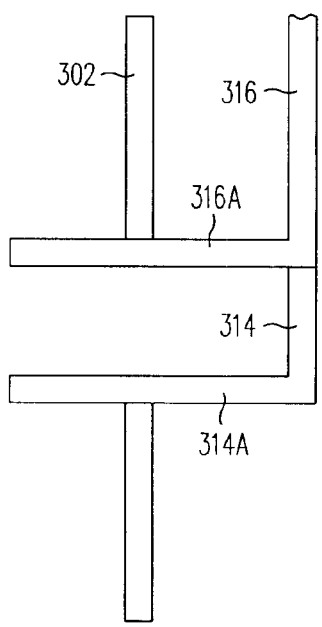
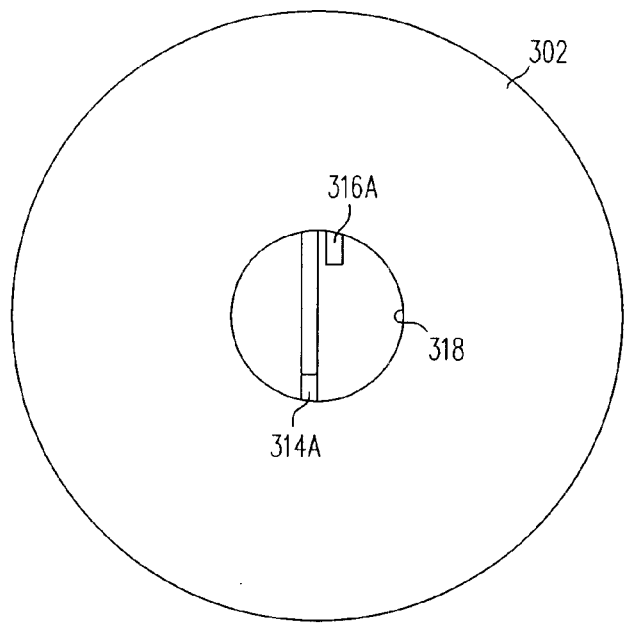
FIG. 6A  FIG. 6B
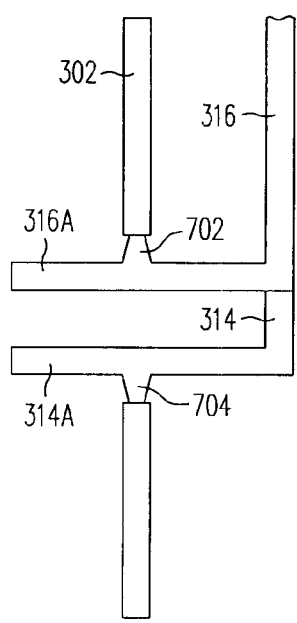
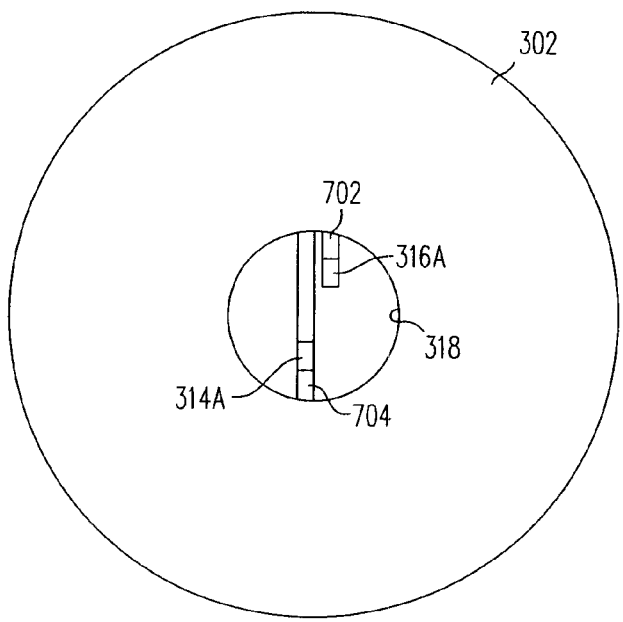
FIG. 7A  FIG. 7B

DISK LUBRICATION MECHANISM

FIELD OF INVENTION

The present invention relates to the manufacture of magnetic and optical recording media and in particular to a method and apparatus for applying lubrication to the surface of the media.

BACKGROUND

In a conventional contact start-stop (CSS) operation of a hard disk drive, the magnetic head slides against the disk surface when the disk is spun up and down. To protect the magnetic head and the disk surface from the frictional effects of CSS operations, the disk surface is lubricated in fabrication.

FIG. 1 illustrates a prior art apparatus 100 for lubing disks. A linear stage 102 lowers a mandrel 104 with a conventional disk 106 resting thereon into a lubrication tank 108 filled with lubrication solution 110. The disk is then lifted out of the solution or alternatively the lubrication solution is drained, leaving behind a thin (1–10 nm) layer of lubrication on the surface of the disk. Disk 106 has, e.g., an inner diameter (ID) 114 of 25 mm and an outer diameter (OD) of 95 mm. An arrow 116 indicates the travel of mandrel 104 into and out of lubrication tank 108. Mandrel 104 includes a notch 112 where ID 114 of disk 106 rests upon. As FIG. 1 illustrates, lubrication solution 118 often collects around notch 112 and deposits excessive lubricant on disk 106 due to the improper drainage. While excess lubricant is a reliability and performance concern for media, the amount deposited on disk 106 is acceptable because it affects only a small percentage of the total area of disk 106.

FIG. 2 illustrates the use of conventional apparatus 100 to apply lubrication to a disk 122 which has a small form factor. Disk 122 has, e.g., an ID 124 of 7 mm and an OD of 27.4 mm. Lubrication solution 118 again collects around notch 112. Excessive lubricant on disk 122 near ID 124 produces an undesirable result. Compared to disk 106, excessive lubrication 118 is of greater concern for disk 122 because disk 122 has a smaller surface area. Thus a greater portion of the surface of disk 122 will have excess lubrication 118 deposited thereon then will disk 106. Disk 122 is also more likely to sway and tip over as it hangs from mandrel 104 because disk 122 is lighter. Furthermore, as the lubrication solution moves across the surface of the disk, surface tension imbalances may cause the disk to tilt. This phenomenon can slow down production and cause non-uniformity in disk lubrication.

Thus, what is needed is a system that lubricates a small form factor disk without excessive lubrication around its inner diameter and unwanted movement of the disk during processing.

SUMMARY

A system for processing a disk includes a tank, a base adjacent to the tank, a rotary actuator mounted to the base, and an end-effector mounted to the rotary actuator. The end-effector includes a plurality of fingers and an actuator linked to at least one finger. The actuator closes the fingers so they can be inserted into an inner diameter of the disk. The actuator opens the fingers so they can grip the inner diameter of the disk. Once the fingers have gripped the disk, the rotary actuator rotates the end-effector to a position above the tank. The disk can be brought down into the tank or the tank can be brought up to place the disk within the tank. The tank is then filled with a processing liquid to process the disk.

BRIEF DESCRIPTION OF THE DRAWINGS

FIG. 1 shows a conventional apparatus applying lubrication to a conventional disk.

FIG. 2 shows the conventional apparatus of FIG. 1 applying lubrication to a small form factor disk.

FIGS. 4A, 4B, and 4C show a robot end-effector for holding a disk by gripping the inner diameter of the disk in accordance with one embodiment of the invention.

FIGS. 5A, 5B, 5C, and 5D show the robot end-effector of FIGS. 4A–4C picking up a disk from an air track.

FIGS. 6A, 6B, 7A, 7B, 18, 19, 20, 21A, 21B, and 21C show fingers of the robot end-effector of FIGS. 4A–4C in accordance with embodiments of the invention.

FIGS. 23A and 23B show the fingers of the end-effector can be inserted into the inner diameter of the disk offset from the center of the inner diameter.

DETAILED DESCRIPTION

Figure 3:
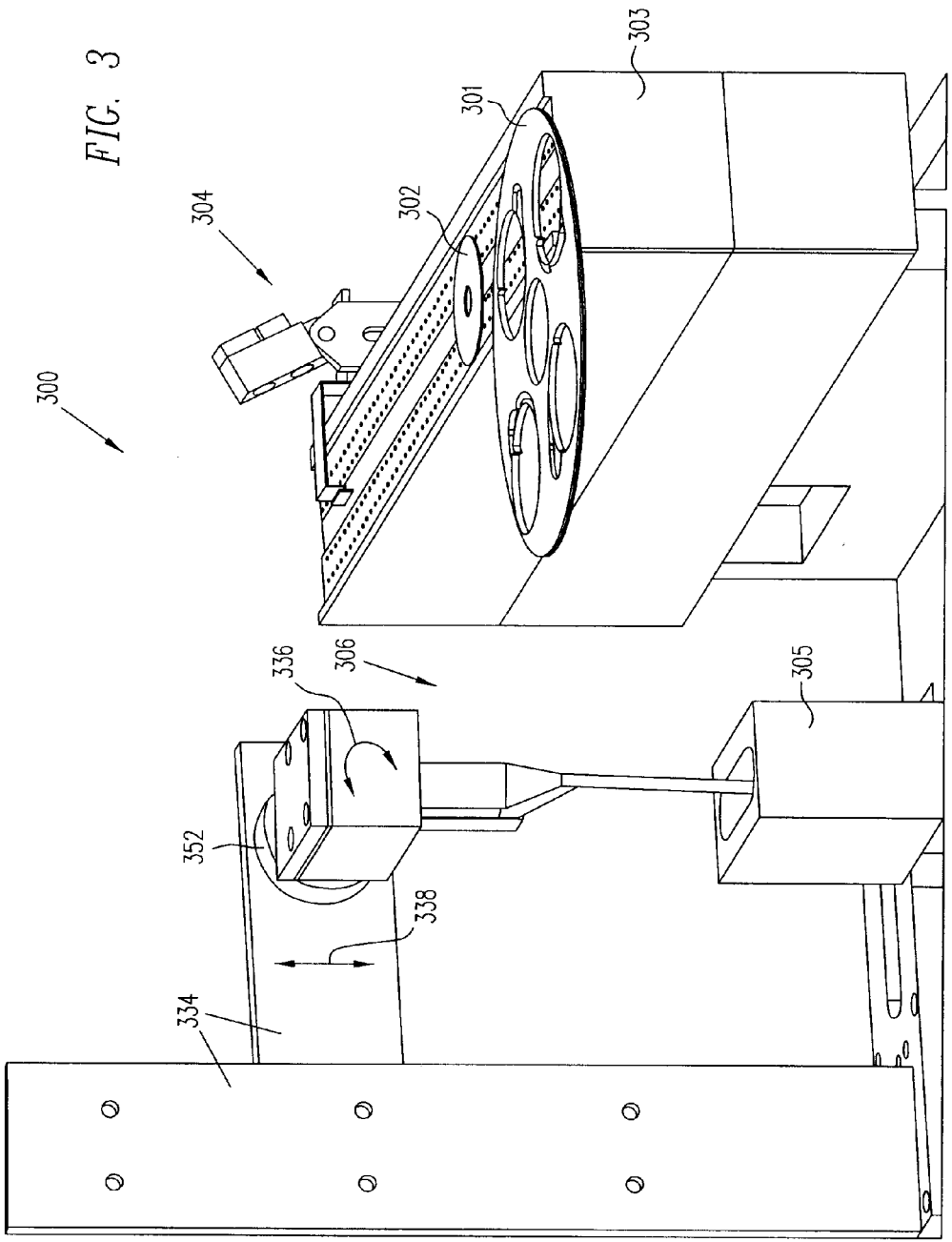
FIG. 3 shows a disk processing system in accordance with one embodiment of the invention.

FIG. 3 illustrates a perspective view of a system 300 used to process magnetic or optical disks in accordance with an embodiment of the invention. A sputter pallet unloader 301 unloads a disk 302 onto an air track 303. For more details regarding pallet loader 301 (shown in part) and air track 303, the reader is directed to U.S. application Ser. Nos., 09/810,854, entitled "Sputter Pallet Loader", (now is U.S. Pat. No. 6,461,085) and Ser. No. 09/810,834, entitled "Air Track Conveyor System for Disk Production", which are filed herewith, having the same assignee and are incorporated herein by reference. Air track 303 transports disk 302 to a processing station where a stopper assembly 304 arrests the motion of disk 302. For more details regarding stopper assembly 304, the reader is directed to the above-referenced U.S. application Ser. No. 09/810,834. The processing station includes an end-effector 306 driven by a rotary actuator 352 and a linear stage 334. The end-effector 306 picks up disk 302 and places it within a tank 305 for processing. Tank 305 can be filled with a liquid to process the disk.

FIGS. 4A and 4B illustrate an end-effector 306 used to remove disk 302 from air track 303 (both shown in FIG. 3) for processing. End-effector 306 includes an actuator 308, a stationary arm 314 fixedly mounted to actuator 308, and a movable arm 316 slidably mounted to actuator 308. Arms 314 and 316 include respective fingers 314A and 316A. Of course, each of arms 314 and 316 can include more than one fingers. A spring 326 links arms 314 and 316. FIG. 4A shows that spring 326 holds arm 316 at a first position so fingers 314A and 316A are held apart when actuator 308 is not activated. Fingers 314A and 316A are "open" when actuator 308 is not activated. FIG. 4B shows that actuator 308 translates arm 316 to a second position so fingers 314A and 316A are held together when actuator 308 is activated. Fingers 314A and 316A are "closed" when actuator 308 is activated.

FIG. 4C show an exploded view of actuator 308. Actuator 308 includes a housing 320 with a bore 321. A plunger 324 is placed within bore 321. In some implementations, plunger 324 is inserted into a bushing 325 also placed within bore 321. A diaphragm 322 is placed atop plunger 324. Diaphragm 322 is made of, e.g., latex. A cover 323 secures the perimeter of diaphragm 322 around the opening of bore 321. Cover 323 includes an air inlet 328 to receive pressurized air. Pressurized air pushes against diaphragm 322 to impart motion to plunger 324. Plunger 324 is coupled to arm 316 to impart motion to arm 316 to close fingers 314A and 316A. Of course, other types of actuator such as solenoids and linear motors can be used to close fingers 314A and 316A.

As FIGS. 5A and 5B show, actuator 308 closes fingers 314A and 316A so they can be inserted into the inner diameter (ID) 318 of disk 302. As FIGS. 5C and 5D show, actuator 308 opens fingers 314A and 316A to grip onto ID 318 when fingers 314A and 316A are inserted in ID 318. Spring 326 is selected to exert an appropriate force on ID 318 to securely hold disk 302 without damaging disk 302. Fingers 314A and 316A can be coated with a soft material (e.g., foam or rubber) that grips but does not damage disk 302.

Figure 23B:
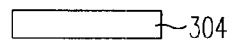

In one implementation shown in FIG. 23A, end-effector 306 is positioned upstream from a location where stopper 304 arrests disk 302 so that fingers 314A and 316A are offset from center 1902 of ID 318 when they are inserted in ID 318. As shown in FIG. 23B, fingers 314A and 316A move disk 302 upstream and away from stopper 304 when they are opened (indicated by arrow 1904). The movement of disk 302 away from stopper 304 prevents disk 302 from contacting stopper 304 when end-effector picks up disk 302 from air track 303. Contact between disk 302 and stopper 304 can cause particles that contaminate disk 302.

In one implementation shown in FIGS. 6A and 6B, L-shaped members form arm 314 and finger 314A, and arm 316 and finger 316A. Fingers 314A and 316A are made thin to reduce their contact area with the surface of the inner diameter of disk 302. Fingers 314A and 316A have featureless surfaces (i.e., flat surfaces). These characteristics reduce the amount of lubrication 618 collected around the contact points between the inner diameter of disk 302 and fingers 314A and 316A.

In another implementation shown in FIGS. 7A and 7B, fingers 314A and 316A further include respective tabs 702 and 704. Tabs 702 and 704 have chamfered corners to further reduce the contact area with the surface of ID 318 of disk 302 and to keep fingers 314A and 316A away from disk 302.

Figure 18:
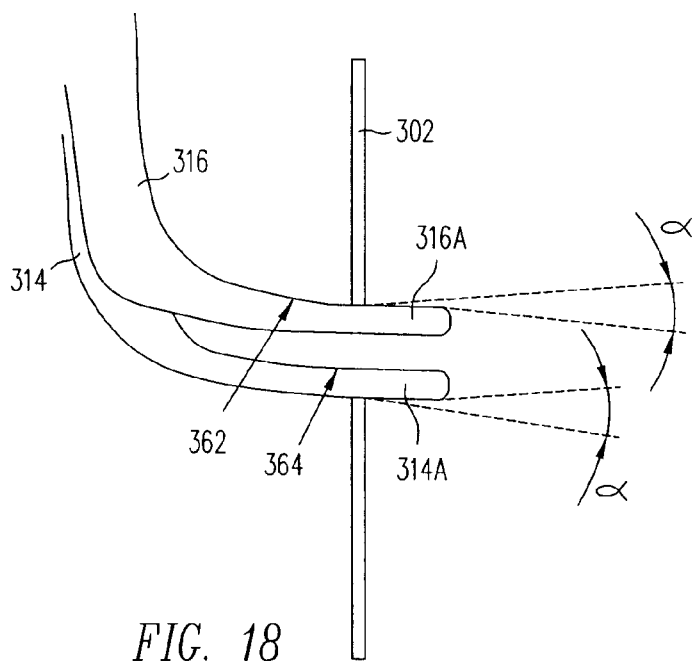

In another implementation shown in FIG. 18, finger 314A has an inner edge 362 that forms an angle α relative to the normal of disk 302 when disk 302 is vertical. Angle α ranges from, e.g., 0 to 30 degrees. Similarly, finger 316A has an inner edge 364 that forms an angle α relative to the normal of disk 302 when disk 302 is vertical. When used to hold disk 302 in a liquid (e.g., a lubrication solution), edges 362 and 364 can gradually break through the liquid surface without creating ripples that may deposit uneven lubrication onto disk 302.

Figure 19:
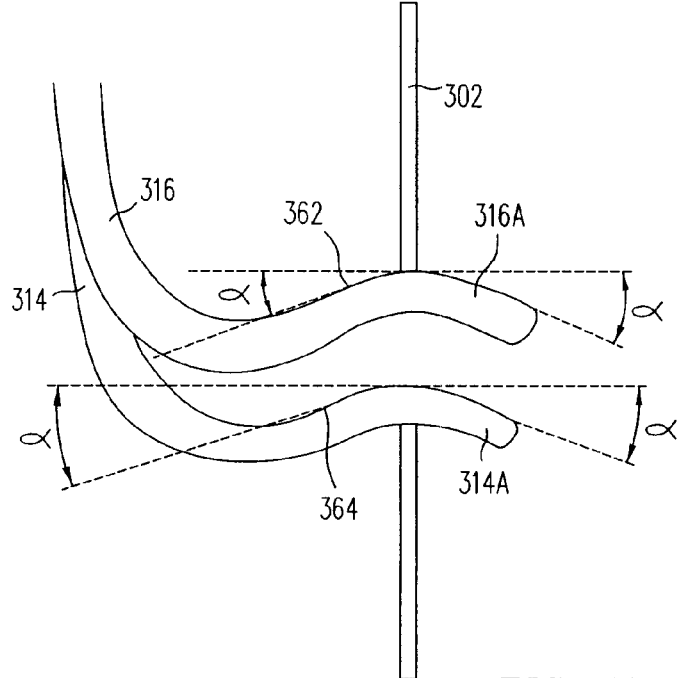

In another implementation shown in FIG. 19, finger 314A has an inner edge 362 that forms an angle α from the normal of disk 302 on both sides of disk 302. This helps to drain the liquid away from both sides of disk 302. Similarly, finger 316A has an inner edge 364 an angle α from the normal of disk 302 on both sides of disk 302.

Figure 20:
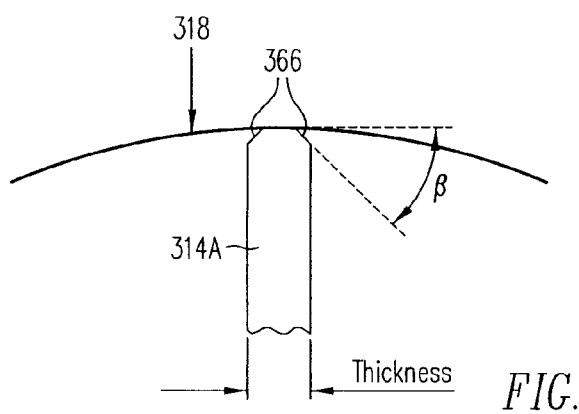

In another implementation shown in FIG. 20, the tips of finger 314A has chamfered corners 366 that form a chamfer angle β. Chamfer angle β ranges from, e.g., 0 to 60 degrees. Finger 316B can be similarly constructed. Chamfered corners 366 help to reduce the contact area with the surface of the ID 318 of disk 302.

Figure 21A:
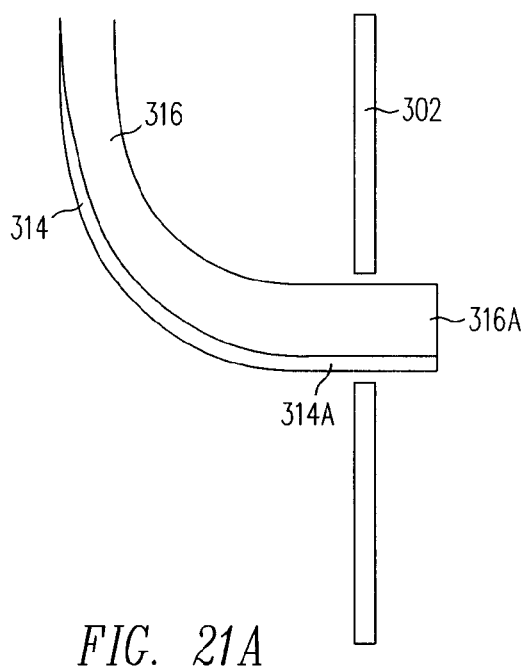
Figure 21B:
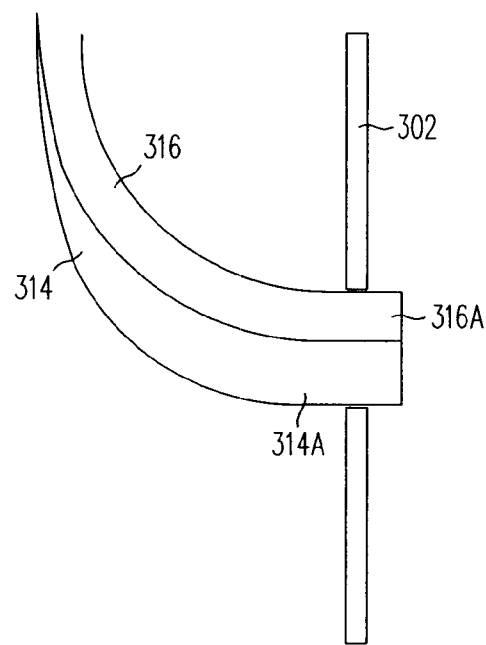

In another implementation shown in FIGS. 21A and 21B, fingers 314A and 314B overlap when they are closed (FIG. 21A) or opened (FIG. 21B). The overlap creates a continuous surface that passes through the liquid surface without creating ripples that can deposit uneven lubrication onto disk 302.

Figure 21C:
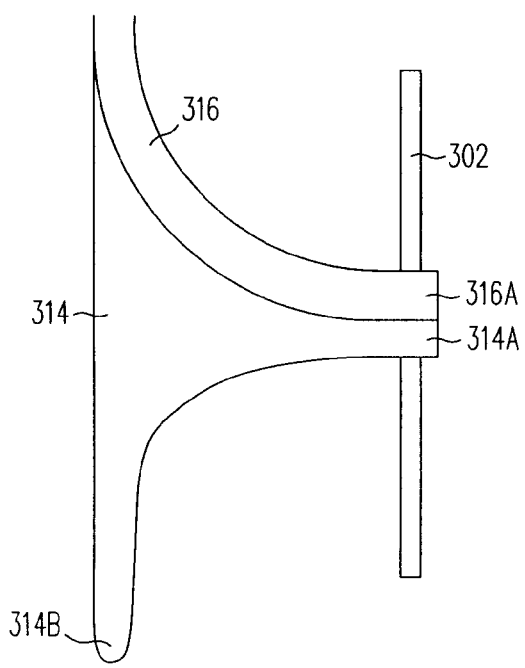

In another implementation shown in FIG. 21C, finger 314A includes an end 314B that extends beyond the bottom end of disk 302. End 314B helps to drain lubrication past the bottom end of disk 302 so that ripples caused by the draining lubrication do not deposit lubrication on disk 302.

FIG. 3 shows that end-effector 306 is mounted a rotary actuator 352. Rotary actuator 352 rotates end-effector 306 as indicated by arrow 336. Rotary actuator 352 is mounted to a linear stage 334. Linear stage 334 translates end-effector 306 up and down as indicated by arrow 338.

Figure 8:
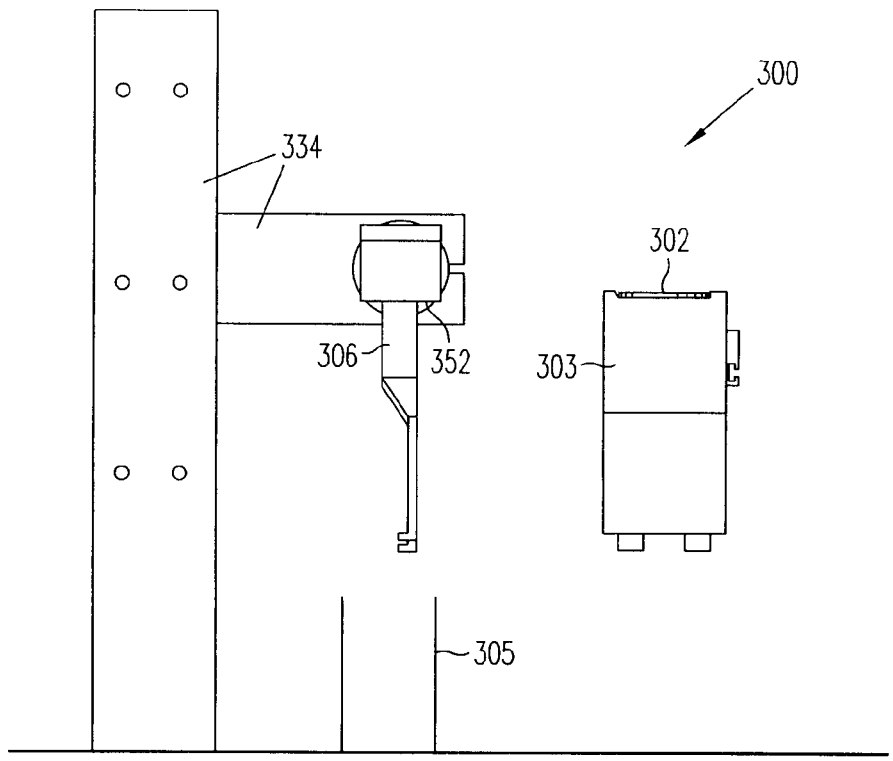
FIGS. 8, 9, 10, 11, 12, and 13 show the system of FIG. 3 applying a processing liquid to a disk in accordance with one embodiment of the invention.

System 300 operates as follows in one embodiment. As shown in FIG. 8, rotary actuator 352 rotates end-effector 306 to a position above a tank 305 with the length of end-effector 306 oriented downward. Stopper assembly 304 (shown in FIG. 3) arrests the motion of disk 302 travelling down air track 303. As shown in FIGS. 5B and 5D, a portion of air track 303 may be angled relative to its width so that disk 302 rests against a reference edge 356 of air track 303. This allows disk 302 to be consistently positioned in a predetermined location before processing.

Figure 9:
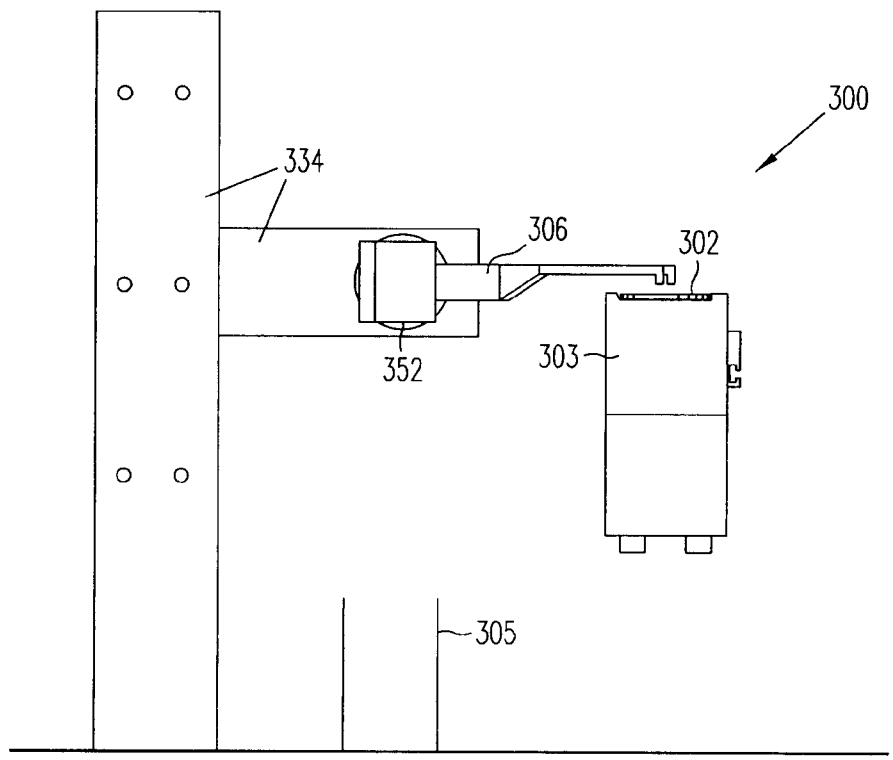

As shown in FIG. 9, rotary actuator 352 rotates end-effector 306, e.g., 270 degrees to place fingers 314A and 316A directly above ID 318 of disk 302. In one implementation, fingers 314A and 316A are placed above the center of ID 318.

Figure 10:
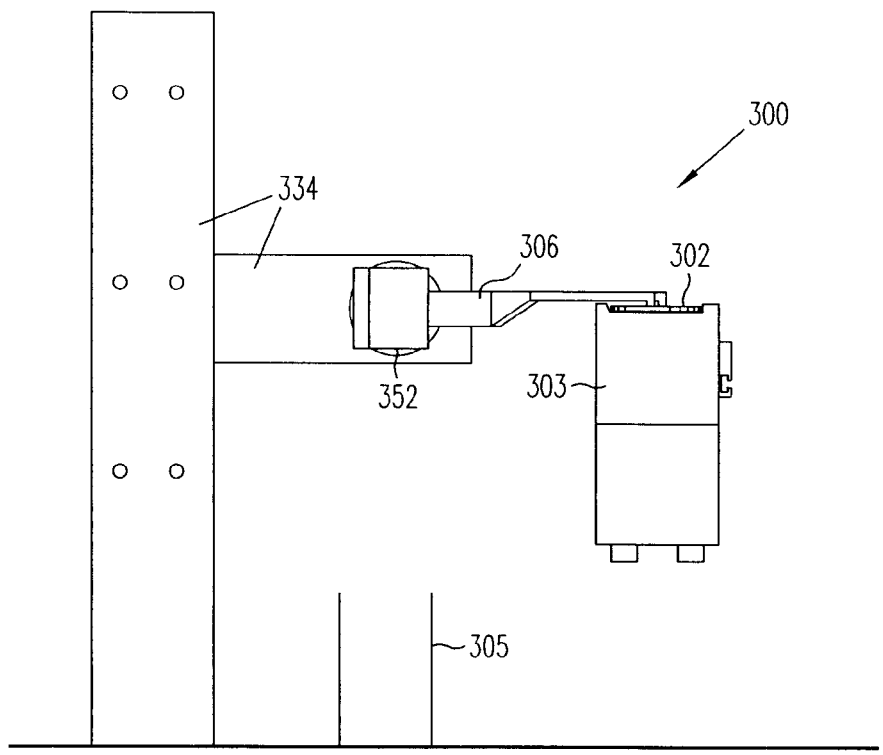

As shown in FIG. 10, actuator 308 closes fingers 314A and 316A and linear stage 334 translates end-effector 306 downward to insert closed fingers 314A and 316A into ID 318. As shown in FIGS. 5A and 5B, air track 303 has a portion of a top surface 360 removed. In one implementation, top surface 360 includes a slot 358 (shown in FIGS. 5A and 5C). Linear stage 334 can translate closed fingers 314A and 316A into slot 358. This ensures that fingers 314A and 316A can be inserted into ID 318 over a range of heights at which disk 302 rides on air track 303. Once fingers 314 and 316 are inserted into ID 318, actuator 308 opens fingers 314 and 316 to grip onto ID 318. As shown in FIGS. 5A and 5C, disk 302 may slide away from reference edge 356 when fingers 314 and 316 are opened.

Figure 11:
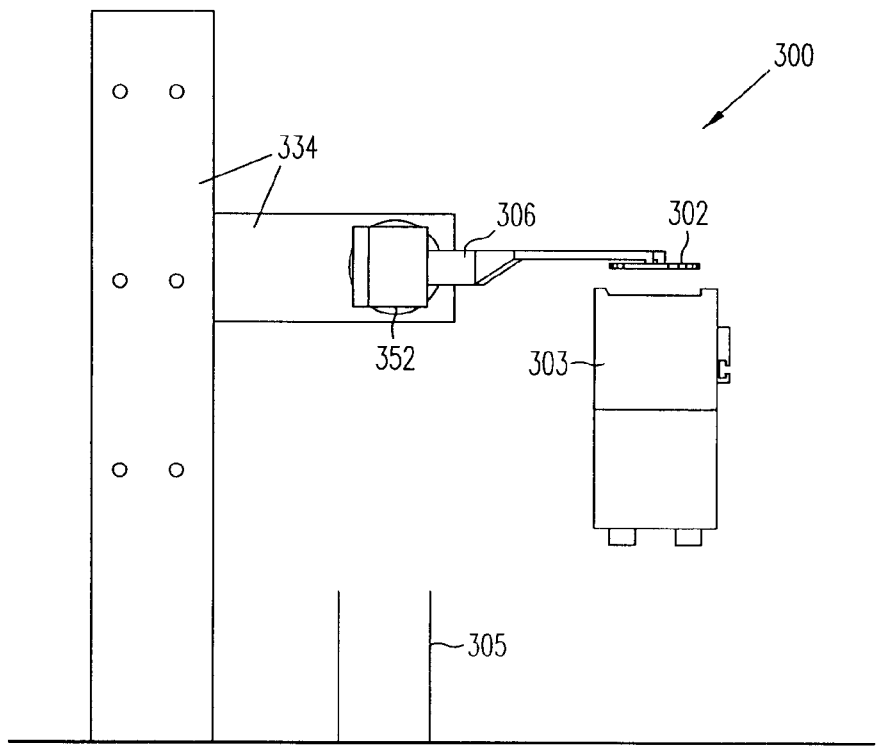
Figure 12:
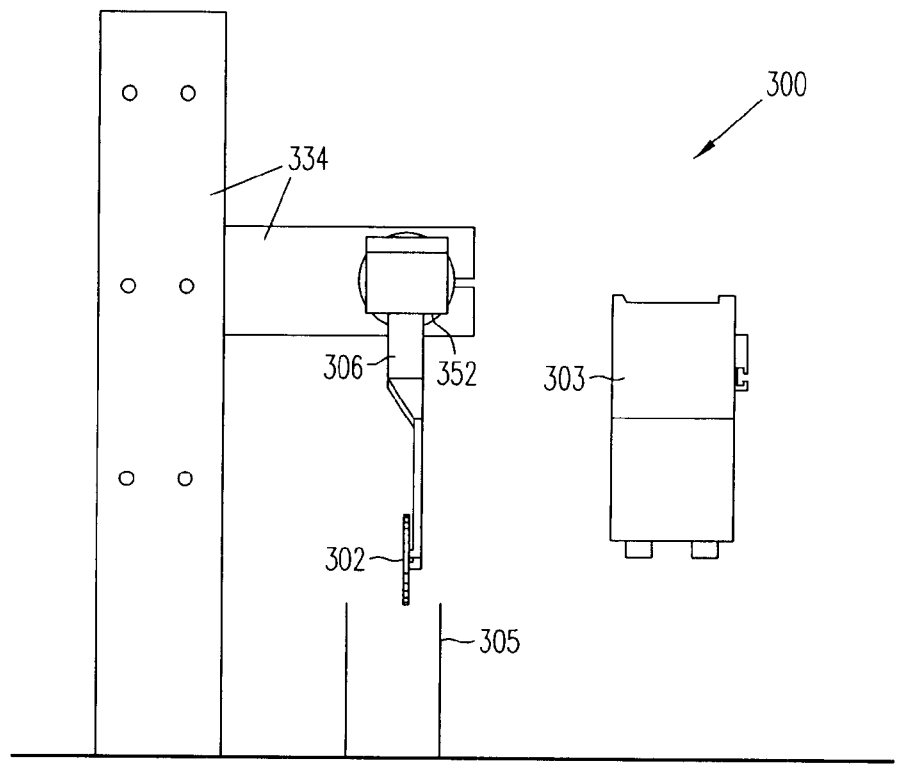

As shown in FIG. 11, linear stage 334 translates end-effector 306 upward to lift disk 302 above air track 303. As shown in FIG. 12, rotary actuator 352 rotates end-effector 306, e.g., −270 degrees to place disk 302 above tank 305.

Figure 13:
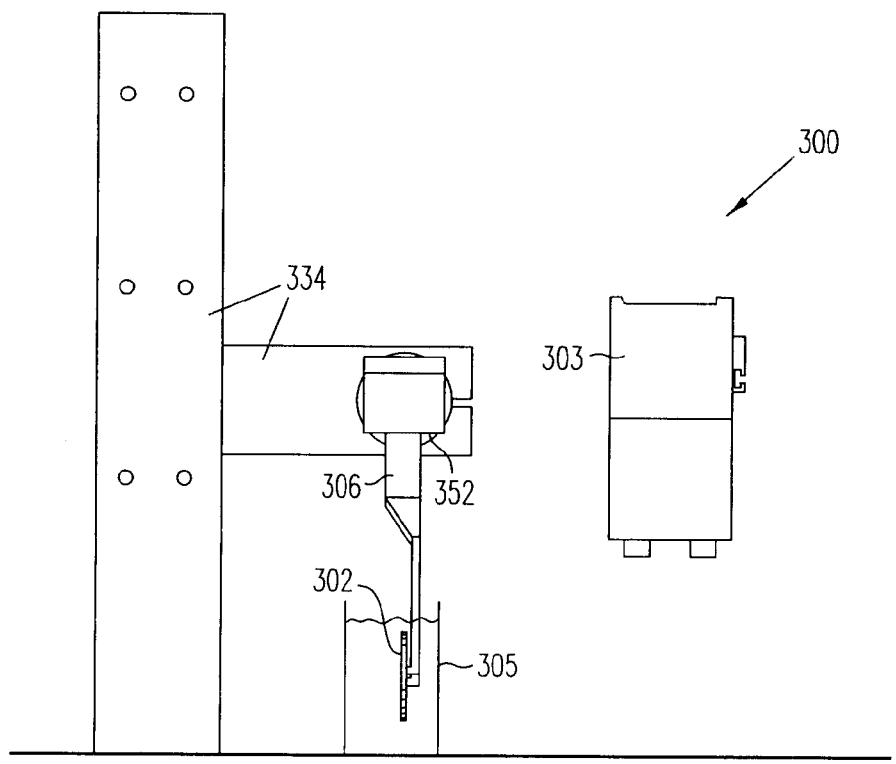

As shown in FIG. 13, linear stage 334 translates end-effector 306 downward to place disk 302 within tank 305. Alternatively, tank 305 can be raised by another linear stage to place disk 302 therein. Tank 305 is then filled with a processing liquid. In one implementation, the liquid is a lubrication solution used to lubricate disk 302. In another implementation, the liquid is a mixture of alcohol and water used to dry disk 302 using the Maragoni effect. Tank 305 can also be filled with the liquid before disk 302 is placed therein.

In the implementation where tank 305 holds lubrication, tank 305 is drained prior to the removal of disk 302. Alternatively, linear stage 334 can translate end-effector 306 upward to removed disk 302 while tank 305 is still filled with lubrication. Otherwise, tank 305 can be lowered away from disk 302 while it is still filled with lubrication.

In the implementation where tank 305 holds a mixture of alcohol and water, linear stage 334 can translate end-effector 306 upward to remove disk 302 while tank 305 is still filled with the mixture. Alternatively, tank 305 is lowered away from disk 302 to remove disk 302 while tank 305 is still filled with the mixture.

To return disk 302 back to air track 303, the above process is reversed. Disk 302 may shift while being held by fingers 314A and 316A during the lubrication process. Thus, when disk 302 is placed above air track 303, it may not have the same orientation as prior to the lubrication process. However, the use of air track 303 tolerates this shift in orientation because air track 303 can cushion and reorient disk 302 once it is released by end-effector 306 back onto track 303.

Figure 14:
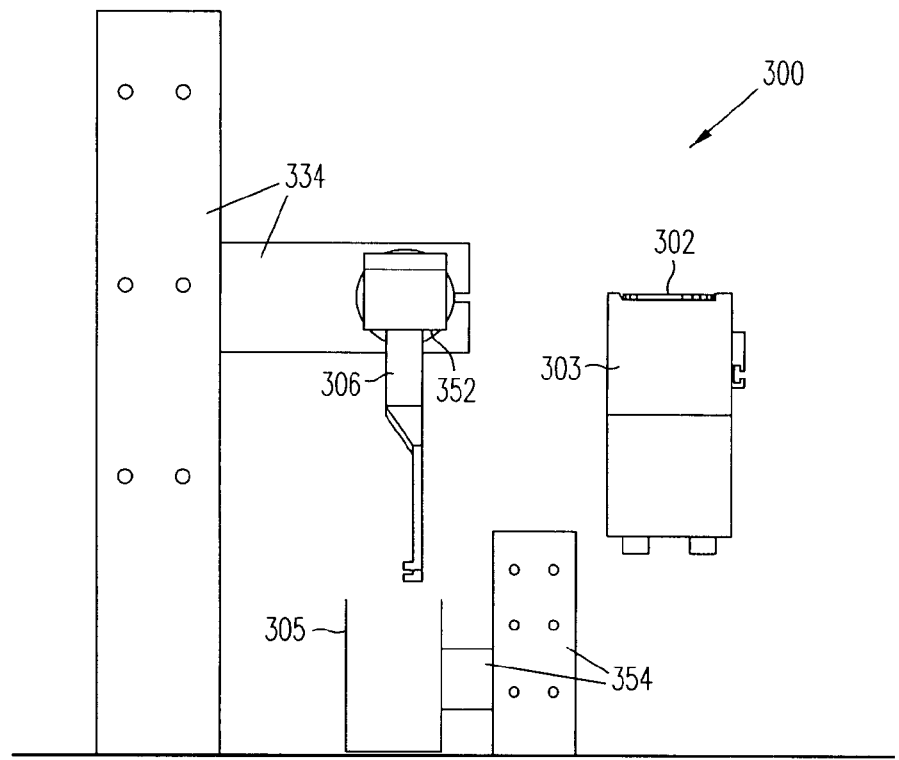
FIGS. 14, 15, 16, and 17 show the system of FIG. 3 applying a processing liquid to a disk in accordance with another embodiment of the invention.

System 300 operates as follows in another embodiment. In this embodiment, linear stage 334 does not translate rotary actuator 352 and end-effector 306. In other words, linear stage 334 acts only as a stationary base where rotary actuator 352 and end-effector 306 are mounted. As shown in FIG. 14, rotary actuator 352 rotates end-effector 306 to a position above tank 305 with the length of end-effector 306 oriented downward. Stopper assembly 304 (shown in FIG. 3) arrests the motion of disk 302 travelling down air track 303.

Figure 15:
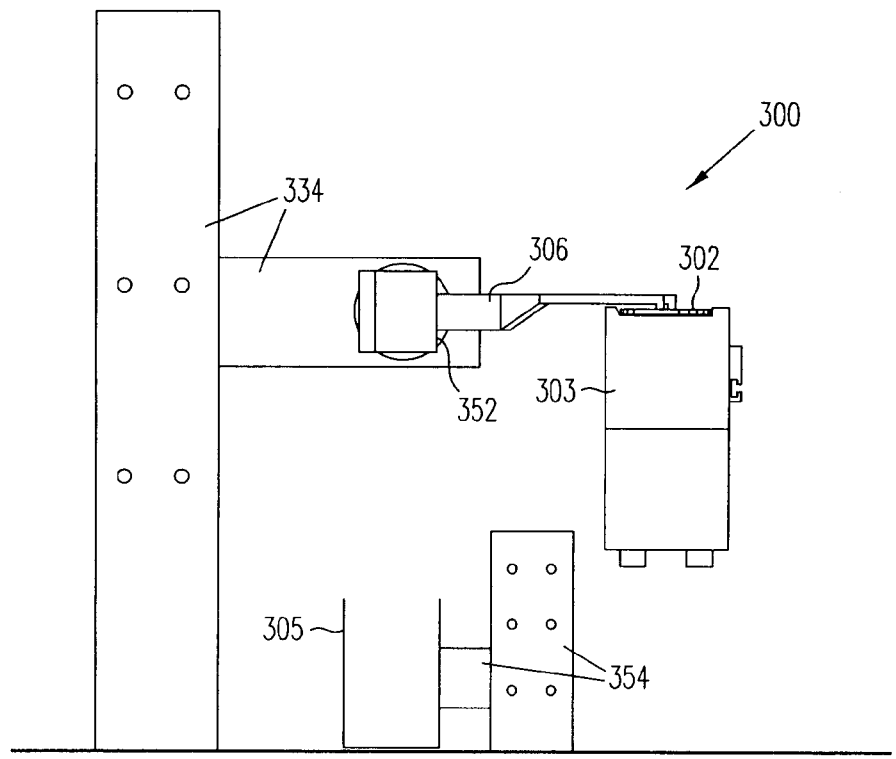
Figure 16:
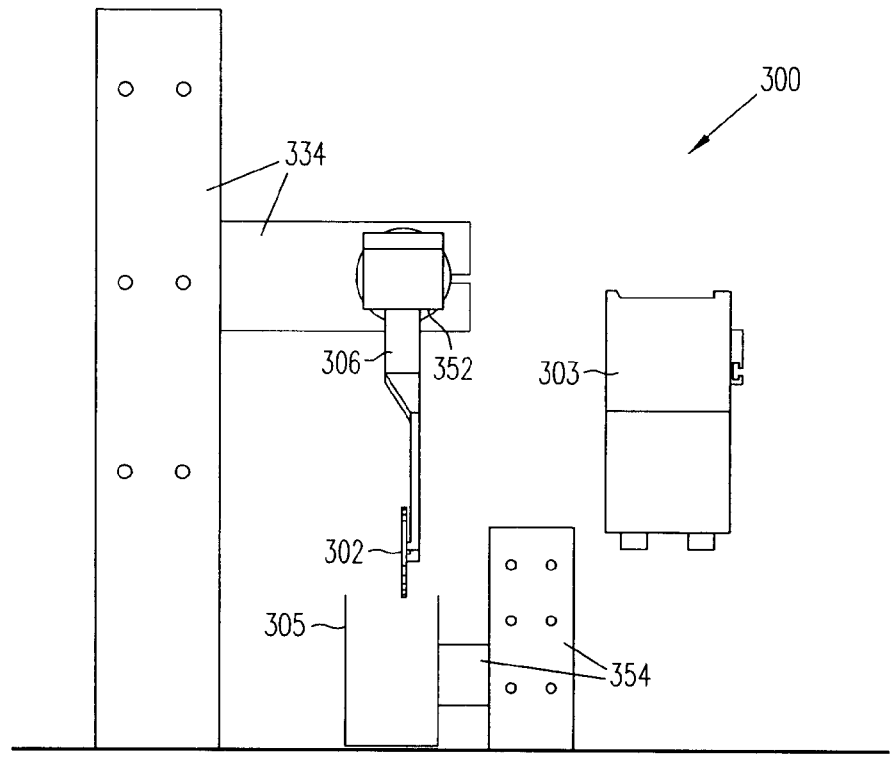

As shown in FIG. 15, actuator 308 closes fingers 314A and 316A and rotary actuator 352 rotates end-effector 306, e.g., 270 degrees to insert closed fingers 314A and 316A into ID 318. Once fingers 314 and 316 are inserted into ID 318, actuator 308 opens fingers 314 and 316 to grip onto ID 318. As shown in FIG. 16, rotary actuator 352 rotates end-effector 306, e.g., −270 degrees to place disk 302 above tank 305.

Figure 17:
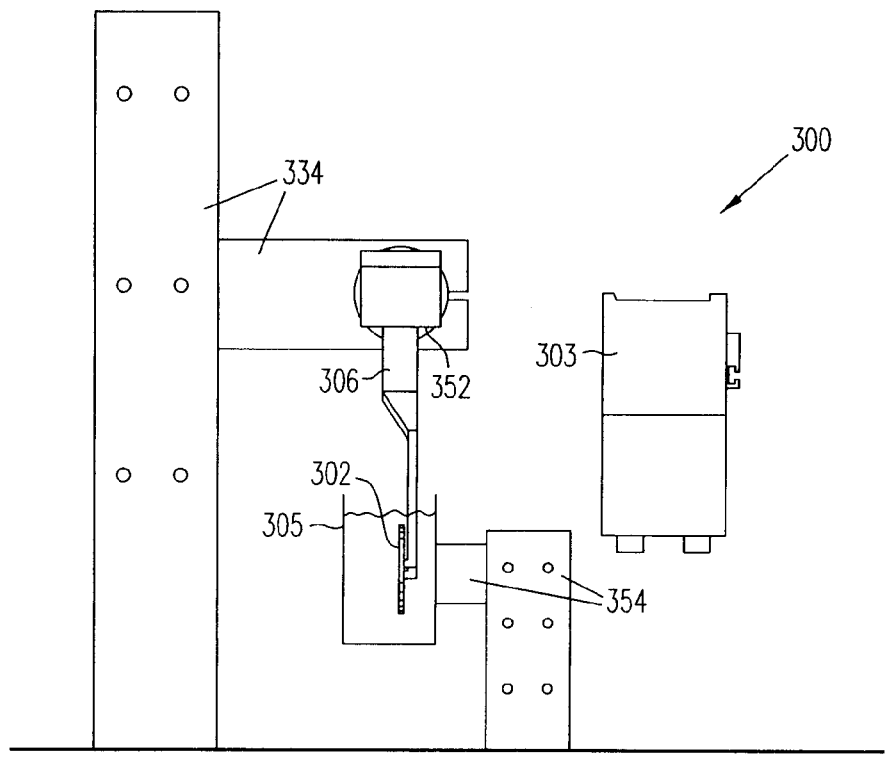

As shown in FIG. 17, a linear stage 354 translates tank 305 upward to place disk 302 therein. Tank 305 is then filled with one of the liquids described above. Alternatively, tank 305 is filled with the liquid before disk 302 is placed therein. Prior to removal of disk 302, tank 305 is drained of the liquid. Alternatively, tank 305 can be lowered away from disk 302 while it is still filled with the liquid. To return disk 302 back to air track 303, the above process is reversed.

Figure 22:
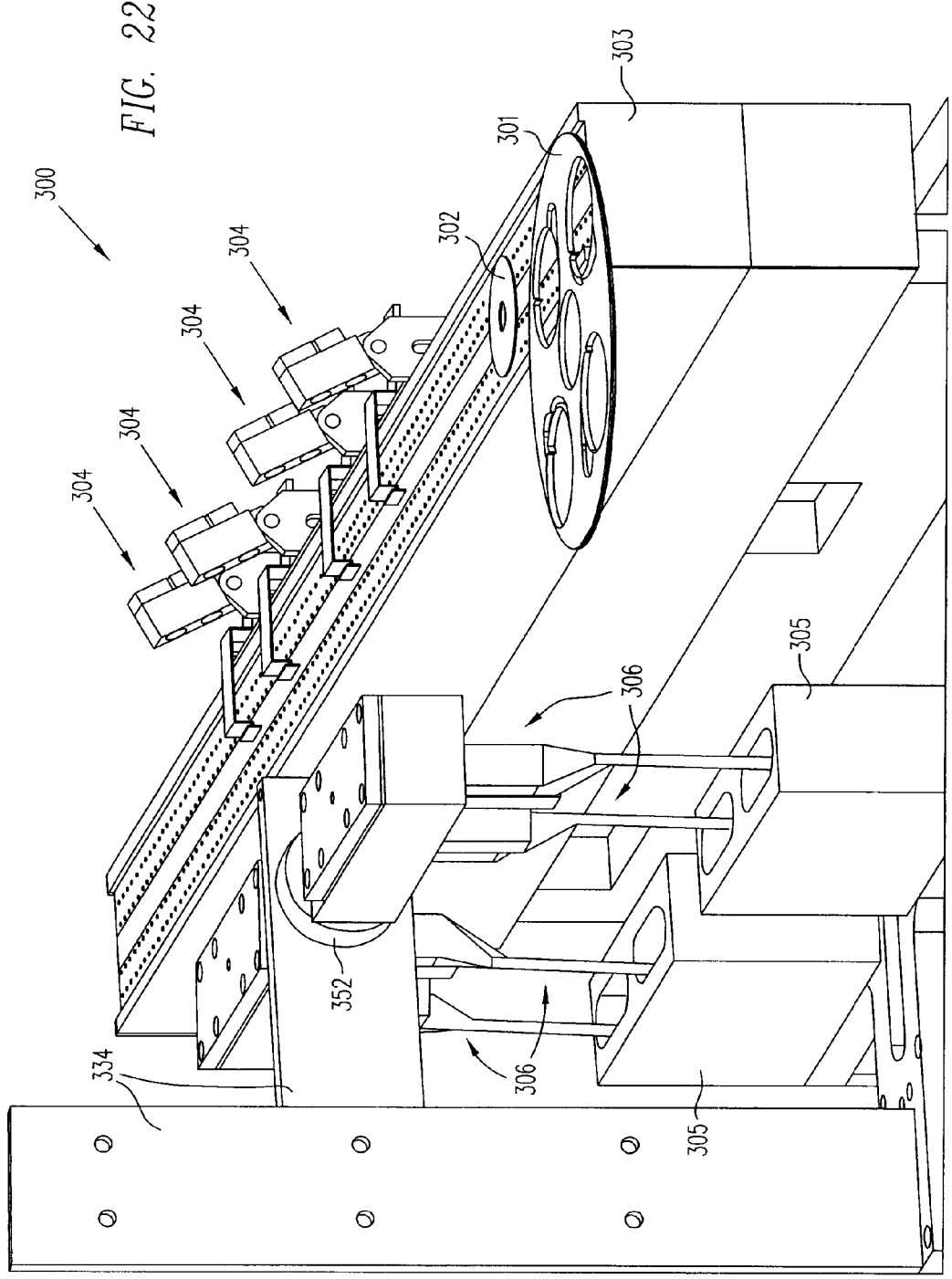
FIG. 22 shows a disk processing system in accordance with another embodiment of the invention.

Although the invention has been described with reference to particular embodiments, the description is only of examples and should not be taken as a limitation. For example, other conventional conveyors can be used instead of the air track conveyor. The robot end-effector can pick a disk out of a disk cassette or off a lifter that lifts a disk out of the disk cassette, including a disk cassette conveyor with or without a lifter that lifts the disk out of a cassette. Furthermore, multiple end-effectors 306 and multiple stopper assemblies 304 can be used in system 300. As illustrated in FIG. 22, multiple end-effectors 306 can be mounted to rotary actuator 352 and multiple stopper assemblies 304 can be mounted to air track 303. This allows rotary actuator 352 and linear stage 334 to drive multiple end-effectors 306. In use, stopper assemblies 304 arrest the motion of multiple disks and end-effectors 306 simultaneously place the multiple disks into tanks 305 for processing. Various other adaptations and combinations of features of the embodiments disclosed are within the scope of the invention as defined by the following claims.

What is claimed is:

1. A system for processing a disk, the system comprising:
    an end-effector for holding the disk for processing, the end-effector comprising:
        a plurality of fingers;
        an actuator linked to at least one finger, the actuator closing the fingers to insert the fingers into an inner diameter of the disk, the actuator opening the fingers to grip the inner diameter of the disk;
    a tank for holding a processing liquid;
    a base adjacent to the tank;
    a rotary actuator mounted to the base; and
    wherein the end-effector is mounted to the rotary actuator, the rotary actuator rotating the end-effector to at least a first position above the tank.

2. The system of claim 1, wherein the processing liquid includes a lubrication solution for lubricating the disk.

3. The system of claim 1, wherein the processing liquid includes alcohol and water for drying the disk.

4. The system of claim 1, further comprising a disk conveyor located adjacent to the base.

5. The system of claim 4, wherein the disk conveyor is a disk cartridge conveyor.

6. The system of claim 4, therein the disk conveyor is an air track.

7. The system of claim 6, wherein the rotary actuator rotates the end-effector to at least a second position where the fingers are inserted into the inner diameter of the disk on the air track.

8. The system of claim 7, further comprising a linear stage, the tank being mounted to the linear stage, the linear stage translating the tank to a third position to place at least a portion of the end-effector which is at the first position into the tank.

9. The system of claim 6, wherein the rotary actuator rotates the end-effector to at least a second position where the fingers are above the inner diameter of the disk on the air track.

10. The system of claim 9, wherein the base comprises a linear stage that translates the end-effector to a third position where the fingers are inserted into the inner diameter of the disk.

11. The system of claim 4, further comprising a stopper positioned adjacent to the disk conveyor, wherein:
    the stopper arrests the motion of the disk; and
    the end-effector is positioned upstream from the stopper so the fingers are inserted offset from the center of the inner diameter of the disk.

12. The system of claim 1, wherein the base comprises a linear stage that translates the end-effector to at least a second position where at least a portion of the end-effector is within the tank.

13. A system for processing a disk, the system comprising:
    an end-effector for holding the disk for processing, the end-effector comprising:
        a plurality of fingers;
        an actuator linked to at least one finger, the actuator closing the fingers to insert the fingers into an inner diameter of the disk, the actuator opening the fingers to grip the inner diameter of the disk;
    a housing with a bore;
    a plunger located within the bore, the plunger being linked to at least one of the fingers;
    a diaphragm located within the bore atop the plunger;

an air inlet in communication with the diaphragm;

a cover mounted atop the bore, the cover defining a space above the diaphragm; and wherein when the space is filled with air through the air inlet, the diaphragm moves the plunger and the plunger moves at least one of the fingers to close the fingers.

14. The system of claim 13, wherein at least one finger has a tab having a plurality of chamfered corners.

15. The system of claim 13, wherein when the fingers grip the inner diameter of the disk and the disk is vertical, at least one finger has an edge forming an angle to the normal of the disk.

16. The system of claim 13, wherein when the fingers grip the inner diameter of the disk and the disk is vertical, at least one finger has an edge forming an angle to the normal of the disk on both sides of the disk.

17. The system of claim 13, wherein at least one finger has a plurality of chamfered corners.

18. The system of claim 12, wherein at least a portion of one of the fingers extends beyond a bottom end of the disk.

19. A system for processing a disk, the system comprising:

an end-effector for holding the disk for processing, the end-effector comprising:
  a plurality of fingers; and
  an actuator linked to at least one finger, the actuator closing the fingers to insert the fingers into an inner diameter of the disk, the actuator opening the fingers to grip the inner diameter of the disk; and
wherein at least portions of the fingers overlap each other when the fingers are opened.

20. A system for processing a disk, the system comprising:

a tank for holding a processing liquid;

a base located adjacent to the tank;

an air track located adjacent to the base;

a rotary actuator mounted to the base;

an end-effector mounted to the rotary actuator, the end-effector comprising:
  a plurality of fingers; and
  an actuator linked to at least one finger, the actuator closing the fingers to insert the fingers into an inner diameter of the disk, the actuator opening the fingers to grip an inner diameter of the disk; and
wherein:
  the rotary actuator rotates the end-effector to at a first position where the fingers are above the inner diameter of the disk on the air track;
  the linear stage translates the end-effector which is at the first position to a second position where the fingers are inserted into the inner diameter of the disk;
  the rotary actuator rotates the end-effector to a third position where the fingers are above the tank; and
  the linear stage translates the end-effector which is at the third position to a fourth position where at least a portion of the end-effector is within the tank.

21. A system for processing a disk, the system comprising:

a tank for holding a processing liquid;

a base located adjacent to the tank;

an air track located adjacent to the base;

a rotary actuator mounted to the base;

an end-effector mounted to the rotary actuator, the end-effector comprising:
  a plurality of fingers; and
  an actuator linked to at least one finger, the actuator closing the fingers to insert the fingers into an inner diameter of the disk, the actuator opening the fingers to grip an inner diameter of the disk; and
wherein:
  the rotary actuator rotates the end-effector to a first position where the fingers are inserted into the inner diameter of the disk on the air track; and
the rotary actuator rotates the end-effector to a second position where the fingers are above the tank.

* * * * *